June 12, 1945.  W. E. MORRIS  2,378,237

METHODS AND APPARATUS FOR ULTRASONIC TESTING

Filed Sept. 2, 1942  5 Sheets-Sheet 1

Inventor
Wilford E. Morris

By
Attorney

Inventor
Wilford E. Morris

June 12, 1945.  W. E. MORRIS  2,378,237
METHODS AND APPARATUS FOR ULTRASONIC TESTING
Filed Sept. 2, 1942  5 Sheets-Sheet 4

Inventor
Wilford E. Morris

Attorney

Patented June 12, 1945

2,378,237

UNITED STATES PATENT OFFICE 2,378,237

METHOD AND APPARATUS FOR ULTRASONIC TESTING

Wilford E. Morris, Akron, Ohio, assignor to Wingfoot Corporation, Akron, Ohio, a corporation of Delaware Application September 2, 1942, Serial No. 457,104

11 Claims. (Cl. 73—67)

This invention relates to methods and apparatus for testing materials for internal and hidden flaws or defects, and, more particularly, is concerned with audible high frequency sonic and inaudible ultrasonic methods and apparatus adapted to readily and accurately locate separations or breaks in a pneumatic tire carcass.

It has been proposed heretofore to employ an X-ray apparatus to locate internal flaws in a tire carcass. If a fluoroscope is used, as is proposed, because X-raying with film is too expensive, it is impossible to detect any separation except perhaps obvious ones that would be apparent to visual inspection.

Also, it has been proposed to employ a vibrator accompanied by a stethoscope vibration pickup to seek for flaws in a tire carcass. The vibrator is positioned against one portion of the tire and the stethoscope is positioned on another portion of the tire and any change in the normal vibration pickup of the stethoscope is said to indicate a flaw in the tire. However, the vibrator, which is operated at 60 cycles, has been found to be unsatisfactory except for locating relatively large and visually apparent defects. This is due to the fact that the diffraction or bending of a sound wave increases at the lower frequencies, for example frequencies of 60 cycles. Thus, a 100 cycle sound wave, for example, will bend completely around an obstacle of as much as two feet linear dimension which is placed in the path of the waves. This means, then, that a sound pickup device placed in the back of the object would have almost the same response it would have if the obstacle were removed.

The reflection of low frequency sound waves from a thin air film in rubber, as would be the case for a separation, is unsatisfactory. It should be borne in mind that a high degree of reflection from the air film is desired. For a 100 cycle wave, for example, an air film or pocket of thickness greater than .01 centimeter is required for an appreciable reflection. Further, a 100 cycle vibration or wave is substantially non-directional, which means that it will spread out equally in all directions.

Hand and eye inspection of pneumatic tire carcasses for internal separations, ply breaks, or other flaws or defects is a relatively slow and unsatisfactory procedure, and it is extremely difficult, and usually impossible, to locate internal defects which may cause failure of the tire in subsequent use, or render it inadvisable to retread the tire.

It is the general object of my invention to avoid and overcome the foregoing and other difficulties of prior art methods and apparatus by the provision of improved, relatively inexpensive, easily operated and performed methods and apparatus for detecting internal flaws in materials, and, particularly internal ply separations or defects in a pneumatic tire carcass.

Another object of my invention is the provision of a self-contained, relatively inexpensive and long-lived apparatus adapted to be operated by the ordinary workman to rapidly and accurately locate any and all flaws in a pneumatic tire carcass.

Another object of my invention is the provision of inaudible ultra sonic methods or audible high frequency sonic methods for inexpensively and rapidly locating any and all defects in a pneumatic tire carcass, metallic castings, or the like.

Another object of my invention is the provision of apparatus employing inaudible ultra sonic frequencies or audible sonic high frequencies for locating defects in a tire carcass and the like.

The foregoing and other objects of my invention are achieved by the provision of a method including the steps of directing high frequency sound waves to strike a portion of a tire immersed in liquid, picking up the sound waves from another portion of the tire immersed in the liquid, and generally, a portion opposed to that portion of the tire receiving the sound waves, changing the picked up sound waves to provide sensuous indication thereof, effecting relative movement between the tire and sound waves so as to subject different portions of the tire to the sound waves, and noting any change in the sensuous indication which would indicate a separation or break in the tire. A change in the sensuous indication is brought about by the fact that the sound waves are reflected or otherwise dispersed from a separation or break, and thus the sound wave is not transmitted to the indicator, and accordingly is not registered by the indicator.

The apparatus of my invention includes means for supporting a tire or the like, usually for rotation about a horizontal axis, means for holding liquid in engagement with at least a portion of the tire, means for creating waves or vibrations of between about 10,000 cycles and about 50,000 cycles per second in the liquid, means for directing the waves against a portion of the tire immersed in the liquid, means for picking up the waves from another portion of the tire immersed in the liquid and opposed to that portion of the tire receiving the waves, means for amplifying the picked up waves, means for filtering out substantially all waves except those within the transmitted frequencies, and means for changing the filtered waves to provide sensuous indication thereof.

For a better understanding of my invention reference should be had to the accompanying drawings wherein.

Figure 22:
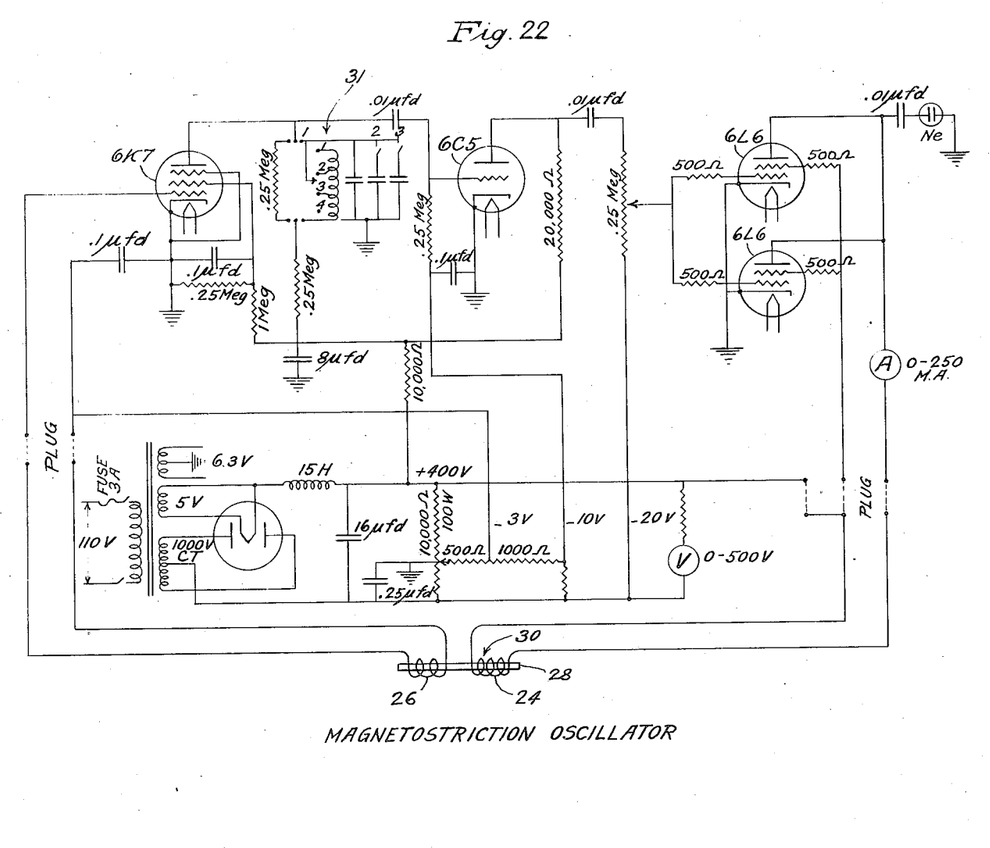
Fig. 22 is a schematic wiring diagram of the magneto-striction high frequency oscillator incorporated in the apparatus.

Any suitable source of ultrasonic or audible high frequency sound waves may be employed. However, I have found it convenient to use a magneto-striction oscillator which operates on the principle of a vacuum tube oscillator unit having a coupling between the plate output circuit and the grid of the input tube, and with the plate and grid coils being coupled by means of a nickel rod or tube, usually a tube with or without a closed end, one end of which is surrounded by the grid coil and the other end by the plate coil. A slight change in the plate current causes a change in the magnetic field of the plate coil which in turn causes the nickel tube to contract or expand (a property called magneto-striction which is inherent in magnetic material). This contraction or expansion in the tube produces a changing magnetic field in the grid coil which in turn causes a change in the electromotive force on the grid of the input tube. Thus, conditions are present for the system to break into oscillation at a frequency which is determined by the length of the nickel tube. The oscillator is designed in the apparatus of my invention to work at frequencies between 10 and 50 kilocycles. The vibrating nickel tube then produces sound waves corresponding to its longitudinal vibrations. The circuit of the oscillator is shown in Fig. 22. The plate coil 24 consists of 1,000 turns of #30 copper wire with taps at 200, 400, 600 and 800 turns. The grid coil 26 consists of 500 turns with taps at 100 and 300 turns. The coils are shielded with a metal cover and the nickel tube 28 is clamped at the center. The assembly of tube and coils and cover form a compact unit indicated by the numeral 30. In that the oscillator unit 30 is the same throughout the several embodiments of my invention illustrated I have employed the same numeral throughout to designate the oscillator.

The filter between the first and second stages of the oscillator, and indicated as a whole by the numeral 31, consists of a three gang air condenser and an inductance of 2,800 turns of copper wire wound on a spool 3 inches in diameter and 6 inches long. The filter is designed to give resonance at any value between 10 and 50 kilocycles. The remaining parts of the oscillator are appropriately marked with legends appearing on the schematic wiring diagram.

Figure 17:
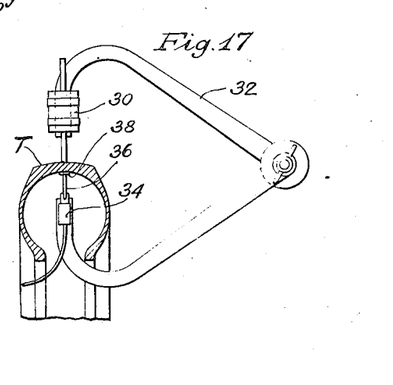
Fig. 17 sectionally illustrates still another embodiment of my invention.
Figure 18:
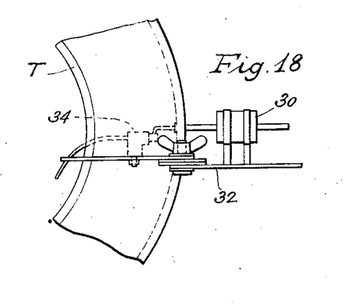
Fig. 18 is a side elevation of the form of my invention illustrated in Fig. 17.
Figure 19:
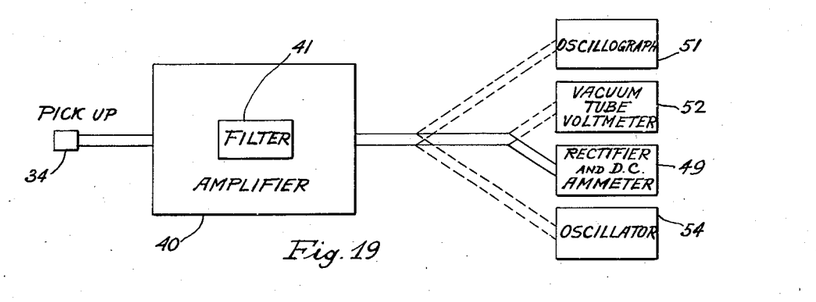
Fig. 19 is a schematic diagram of the pickup, amplifier, filter, and sensuous indicating means employed and forming a part of the invention.
Figure 20:
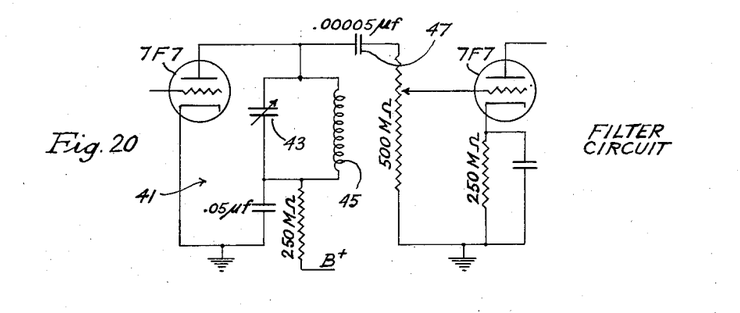
Fig. 20 is a schematic wiring diagram of the filter incorporated in the apparatus illustrated in Fig. 19.

One of the first forms of my invention which was built and tested comprised that illustrated in Figs. 17 and 18. In this particular embodiment of my invention the oscillator 30 was secured to one arm of a large caliper 32 and to the other arm of the caliper was secured a pickup device 34 which, like the oscillator, can take a plurality of forms, but which is conveniently in the form of a piezo crystal of the ordinary phonograph type but with a specially designed needle including a rod 36 secured to the crystal and a flat disc foot 38 usually in the form of a circular disc secured centrally and at right angles to the rod 36. The pickup 34 is connected to the input of an amplifier 40, see Fig. 19. A filter 41 is preferably inserted between stages of the amplifier to cut out all low frequencies and pass only a broad frequency band of the frequency of the oscillator, for example, of frequencies between about 10,000 and 20,000 cycles per second. It was found that the filter was advisable because the pickup of room vibration and other contact noise would otherwise mask out the desired response of the high frequency sound. As illustrated in Fig. 20, the filter 41 is inserted in the plate circuit of the amplifier between the first and second stages. It consists of a small padder condenser 43 in parallel with an inch diameter coil 45 of wire containing several thousand turns. The setting of condenser 43 and the number of turns of wire on the coil 45 are adjusted to give a resonance peak at 15,000 cycles, the frequency employed. In addition the filter consists of a coupling condenser 47 of .00005 microfarad between the plate of the tube of the first stage and the grid of the tube of the second stage. The filter, as described, may be inserted in other places, for example in one of the grid circuits or in the output circuit of the amplifier.

The output of the amplifier 40 is adapted to be connected to any suitable means for the sensuous indication of the sound waves passing in electrical form through the amplifier 40. As illustrated in Fig. 19, the sensuous indicating means are diagrammatically shown to include any one of a rectifier and a D. C. ammeter or voltmeter 49 for visual indication, an oscillograph 51 for visual indication, a vacuum tube voltmeter 52 for visual indication, or an oscillator 54 for audible detection.

Figure 21:
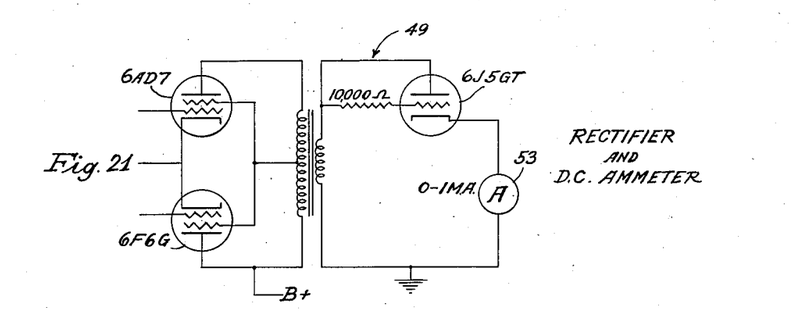
Fig. 21 is a wiring diagram of a sensuous indicating means.

The use of a rectifier and D. C. ammeter is quite simple and convenient and is illustrated in Fig. 21. A 6J5GT tube serving as a rectifier is connected to the amplifier output. The rectified current is indicated by a milliammeter 53. The amplifier gain is preferably adjusted so that the meter gives a full scale deflection for a good portion of the tire being tested, and with the meter response dropping to practically zero when a separation or break in the tire carcass is under inspection. Due to the simplicity and sensitivity of the rectifier and D. C. ammeter, it is employed in the preferred embodiment of my invention.

The oscillograph 51 gives a sine wave trace of the signal as received from the amplifier. The oscillograph is adjusted so as to give a full scale trace for a good portion of the tire being tested, and with the sine wave trace diminishing to practically zero when a separation or break in the tire carcass is under inspection. The vacuum tube voltmeter 52 is substantially standard in construction, and, preferably, is adjusted so that the voltmeter gives full scale deflection for a good portion of the tire being tested, and with the voltmeter response dropping to pracitcally zero when a separation or break in the tire carcass is under inspection. The use of the oscillator 54 involves the principle of beat note detection, with the oscillator being, for example, of a General Radio Company Type 684—A. The output of the amplifier 40 is fed into the heterodyne stage of the oscillator 54, and the oscillator is tuned to a frequency differing from the incoming signal by 1,000 cycles. Thus, a 1,000 cycle beat note can be heard in a pair of earphones. The beat note is strong and full when a good portion of the tire is being tested, but the intensity of the beat note drops very considerably when a separation or flaw comes within the test area.

The caliper method and apparatus illustrated and above described entail pressing the nickel tube of the oscillator 30 against the outside of the tire on the tread or side walls thereof, and pressing the foot 38 of the pickup needle 36 against the inside of the tire opposite the oscillator. The caliper arrangement assures that the pickup is always lined up properly with the oscillator, a necessary condition since the sound from the end of the tube is very directional. The response of the apparatus varies somewhat depending upon the applied pressure of the pickup and the oscillator tube on the tire and on the angle the tube makes with the plane of the portion of the tires under inspection. When the caliper is made sufficiently rigid, reproduceable and satisfactory results can be obtained by an operator after a little practice in manipulating the apparatus. However, the method and apparatus of Figs. 17 and 18 possess the difficulty of applying the vibrator and pickup to the curvature of the tire and the irregularities of the tire surface, and considerable labor is involved in completely inspecting a tire inasmuch as only an area substantially equal to the area of the one-half inch diameter nickel tube of the oscillator can be inspected at a time.

Figure 1:
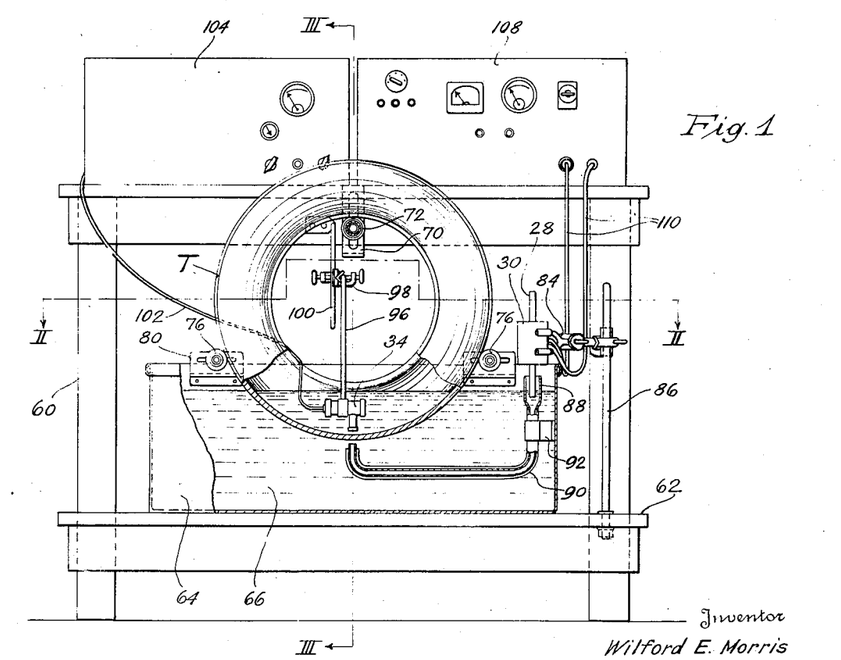
Fig. 1 is a front elevation of one embodiment of apparatus incorporating the principles of my invention.
Figure 2:
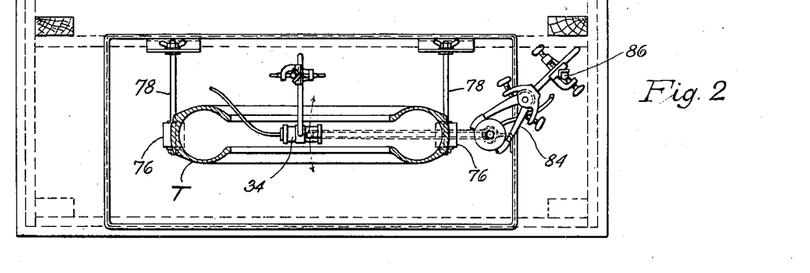
Fig. 2 is a horizontal sectional plan view of the apparatus shown in Fig. 1 and taken substantially on line II—II thereof.
Figure 3:
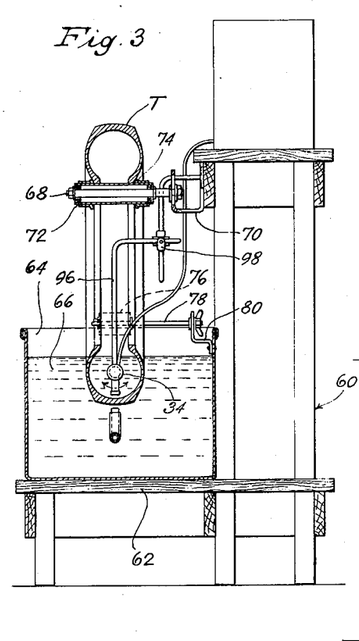
Fig. 3 is a side elevation, partially in section, and taken substantially on line III—III of Fig. 1.

Accordingly, it is quite preferable to avoid the disadvantages inherent to the caliper arrangement by employing a liquid contact method and apparatus which will now be described. Referring to Figs. 1, 2, and 3 of the drawings, the numeral 60 indicates a suitable frame or stand made of wood or metal and having an offset base portion 62 adapted to support a tank 64 containing a suitable liquid 66, usually water. The pneumatic tire T to be tested is arranged to be supported for partial arcuate contact with the liquid in the tank 64, and for rotary movement, and to this end, I provide a shaft 68 supported at one end for vertically adjustable movement in a bracket 70 centrally secured to one side of the frame 60 above the tank 64. The shaft 68 rotatably carries a roller 72 having flange portions 74 adapted to receive and center the tire T thereon. To further support and align the tire T, I may provide rollers 76 rotatably carried on suitable shaft 78 and adjustably secured to brackets 80 fastened to the tank 64, so that, as best seen in Fig. 1, the rollers 76 engage with the tire T at points approximately 120 degrees apart and 120 degrees from the roller 72. Thus, the tire T carried on the rollers 72 and 76 extends down into the liquid 66 and is supported for rotation about substantially a horizontal axis.

The oscillator 30 is adjustably gripped by a clamp 84 which is in turn adjustably secured to a vertically extending rod 86 secured to the base 62. The end of the nickel tube 28 associated with the oscillator 30 extends into the end of a metal tube 88 which is generally belled at its end adjacent the tube 28 so that the tube 28 is received within the tube 88 but does not engage with any portion of the tube 88. The tube 88 is bent into substantially a U-shape, and extends into a position adjacent the bottom center of the tire T. The end of the tube 88 adjacent the tire is open so that the liquid 66 flows in the tube to the level of the liquid in the tank, and with the end of the tube 28 of the oscillator 30 extending down into the liquid at the upper end of the tube 88. I have found that the vibrations or sound waves created by the magneto-striction of the tube 28 are transmitted into the liquid within the tube 88 and follow down through the liquid in the tube and down through the tube walls until the sound waves leave the end of the tube adjacent the bottom of the tire T. Water is a much better transmitter of sound than air because of small absorption losses and also because reflection losses are much less from a water-rubber interface than from an air-rubber interface. Hence the advantage of liquid contact between vibrator and tire, particularly when considered in conjunction with the elimination of the necessity of actual contact between the tire and the vibrating tube.

An air jacket, in the form of a tube 90 surrounding the tube 88, provides an air space between the two tubes to prevent the transmission of sound from the tube walls to the water outside. The tubes 88 and 90 are secured by a bracket 92 to the inside of one end of the tank 64. The tube 88 and the tube 90 may be made of continuously integral, relatively plastic and bendable material, for example, lead, so that the two tubes can be turned to position the same in any desired relation with any particular arcuate portion of the tire, as hereinafter described.

Figure 23:
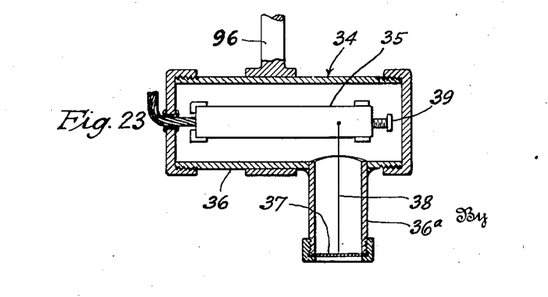
Fig. 23 is a cross sectional view of one form of pickup incorporated in the apparatus of my invention.

A piezo-electric crystal pick-up device 34 is positioned inside the tire opposite to the end of the tube 88. The crystal may be of the displacement type, as illustrated by the ordinary phonograph pickup, or the pickup may be of the inertia type, as for example Brush Company Model VP—1. Either type should be enclosed in a water-proof case. For example, Fig. 23 of the drawings illustrates a displacement type pickup 35 removably held in a waterproof case 36, preferably of metal, and including a sealed-in lateral tube 36a carrying a diaphragm 37 at its outer end. A needle 38 having a right angle bend at its upper end is connected at its lower end to the diaphragm 37 and at its upper end is held in the needle socket of the crystal by a screw 39. In the case of the inertia type pickup, it is sufficient to have the crystal case in contact with the waterproof case. The pickup 34 is adapted to be adjustably held in the indicated position by any suitable means, for example a rod 96 adjustably secured by a suitable clamp 98 to a rod 100 fastened to the frame 60. The pickup 34 is so associated with the rod 96 that the pickup can be swung about a horizontal axis to position itself in any desired arcuate relation with the inside of the tire T.

The crystal pickup 34 is connected by wire 102 to the input of the amplifier 40, which contains the filter 41. The amplifier 40, filter 41, and rectifier and D. C. ammeter 49 are all built into the same cabinet, and form a complete unit identified by the numeral 104. The magneto-striction oscillator apparatus is enclosed in a suitable cabinet 108 mounted on the frame 60 and with suitable wires 110 extending to the oscillator unit 30.

In the operation of the apparatus just described, and in the practice of the method of my invention, the tire T is mounted on the apparatus in the manner illustrated in the drawings and the inside of the tire is supplied with the liquid 66 substantially to the level of the liquid in the tank. The pickup 34 is then positioned opposite the oscillator 30 which is set into operation to produce ultrasonic or high frequency audible sound waves which are transmitted through the tube to a point adjacent the tire T and through the walls of the tire and are picked up by the crystal pickup 34 and with the pickup of the crystal being facilitated by the presence of the liquid within the tire T, all for reasons hereinabove set forth. The apparatus 104 is adjusted so that substantially full scale deflection of the ammeter 49 will occur when a good and undamaged portion of the tire T is having the sound wave transmitted through it. Now the tire T is turned around its horizontal axis on the rollers 72 and 76 so that an area of the tire in the form of a ribbon extending around the circumference of the tire can be examined in short order. Difficulties due to irregularities in the tire surface and due to the curved surface of the tire are avoided, as well as difficulties due to applied pressure variations as exhibited by the caliper method and apparatus already described.

By suitably repositioning the end of the flexible tube 88 and positioning the pickup 34 opposite the repositioned end of the tube 88 and again repeating the revolution of the tire, it is a relatively simple matter to inspect the entire surface of the tire in a few revolutions thereof and with a total consumption of time of not more than five minutes. Further, the apparatus is so simple to handle that it can be operated by the ordinary garage mechanic or service station attendant after simple instructions. The apparatus is adapted to operations upon tires of substantially any size by suitable adjustment of the rollers 72 and 76 and by positioning the tube 88 and pickup 34, as will be understood. By the apparatus and method of my invention I am able to spot any defects in a pneumatic tire casing, such as separations, breaks, and the like, so that the tire can be repaired, replaced, or eliminated from a retreading operation depending upon the character and extent of the defect or injury to the tire carcass.

Figure 4:
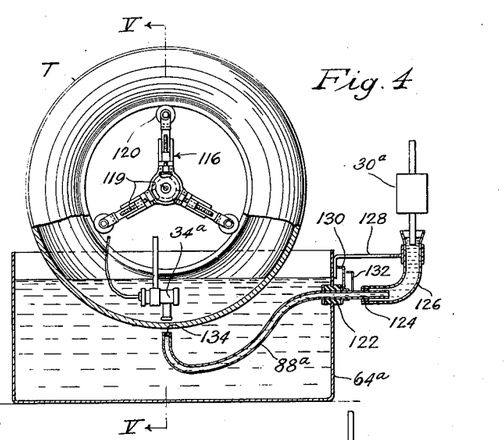
Fig. 4 is a front elevation, partially in section, and illustrating another embodiment of my invention.
Figure 5:
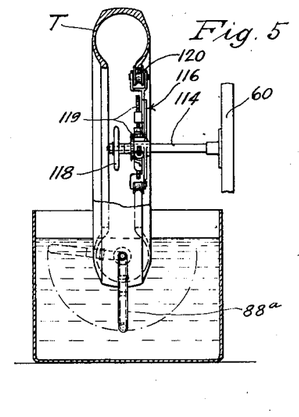
Fig. 5 is a vertical cross sectional view taken substantially on line V—V of Fig. 4.

Turning now to the embodiment of my invention illustrated in Figs. 4 and 5 of the drawing, it will be seen that I provide a somewhat different support for the tire T. Specifically, I replace the rollers 72 and 76 and the associated shafts with a single shaft 114 secured to the frame 60, and on the shaft 114 I support a spider chuck assembly, indicated as a whole by the numeral 116. The assembly includes a wheel 118 and bevel gear and screw means 119 for supporting a plurality of grooved rollers 120 at an adjustable distance from the shaft 114. Thus, by turning the wheel 118 the rollers 120 can be moved out into engagement with the bead of the tire T regardless of the bead diameter and serve to support the tire for rotary movement about a horizontal axis.

Also, the form of my invention illustrated in Figs. 4 and 5 includes a tube 88a which extends through a sealing bushing 122 in the side wall of the tank 64a and a sealing bushing 124 in the end of the tube 126 supported by a bracket 128 on the end of the tank. The tube 88a is free to rotate in the bushings 122 and 124 so that the end of the tube 88a can swing, as best illustrated in Fig. 5, to any arcuate portion of the outer periphery of the tire to test any circumferential element or area of the tire. A scale 130 may be secured to the end of the tank so that a pointer 132 carried by the tube 88a will indicate at all times the position of the end of the tube 88a in relation to the tire T. In the embodiment of the invention shown in Fig. 4 the end of the tube 88a is closed with a suitable plug or diaphragm 134, inasmuch as the tube 126 which is filled with water extends considerably above the level of the liquid in the tank 64a, or the tube may be in the form of a solid rod. If the tube 126 is so constructed and positioned that the water level at the oscillator end can be the same level as the level of the liquid in the tank 64 then the diaphragm 134 in the end of the tube 88a can be eliminated, if desired. Of course, the apparatus of Figs. 4 and 5 can be used in the apparatus of Figs. 1 to 3, if desired.

Figures 6, 7, 8:
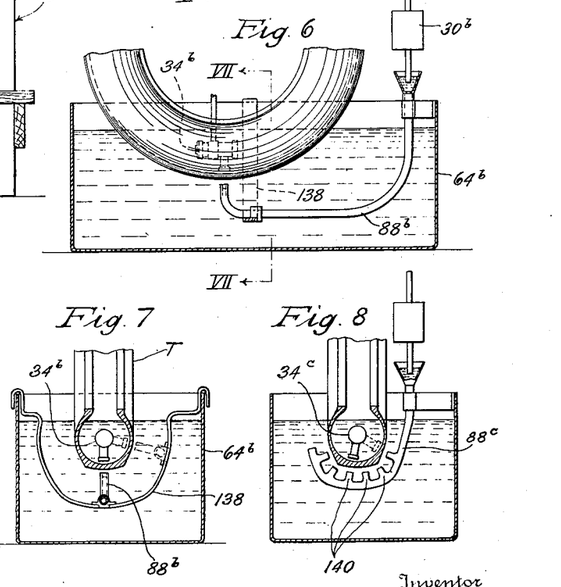
Fig. 6 is a view similar to Fig. 4 and illustrating still another embodiment of my invention.
Fig. 7 is a vertical cross sectional view taken substantially on line VII—VII of Fig. 6.
Fig. 8 is a view similar to Fig. 7 but illustrating still another embodiment of my invention.

Figs. 6 and 7 of the drawings illustrate a further modification of the apparatus which is chiefly distinguished by the use of a guide arm or bracket 138 positioned in the tank 64b and so that the end of the tube 88b can engage therewith and be guided thereby. The bracket 138 may be employed with the tube or rod 88a shown in Figs. 4 and 5 of the drawings, or it may be used with the tube 88 shown in Figs. 1 and 3 of the drawings provided the tube or rod is of a continuously integral and flexible material, for example lead.

Still another embodiment of my invention is shown in Fig. 8 of the drawings wherein the tube 88c is formed with a plurality of short lateral extensions 140 which substantially surround the tread and outer side wall portions of the tire carcass. The tube or rod 88c extends in substantially U-shape around the tire to facilitate the aligning of the lateral extensions 140 with the tire. The pickup 34c is adapted to be moved to a position opposite any given one of the lateral extensions 140 so that by suitably positioning the pickup 34c in conjunction with individual revolutions of the tire the entire desired surface of the tire can be tested for defects. It will be understood that a sufficient portion of the high frequency vibrations created by the oscillator will come out of the lateral extensions 140 as to permit the operation of the apparatus and the practice of my invention.

Figure 9:
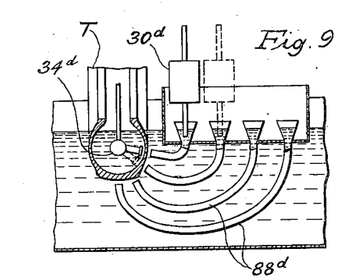
Fig. 9 is a view similar to Figs. 7 and 8, but illustrating still another form of my invention.

In the form of my invention illustrated in Fig. 9 I provide a plurality of oscillators 30d each with an individual associated tube 88d, with the several tubes 88d extending to different positions on the periphery of the tire carcass, and with the ends of the several tubes being positioned substantially in a cross sectional plane of the tire. With apparatus of this type and by suitably moving the pickup 34d so that it will be opposite each one of the ends of the tubes 88d in turn the entire tire carcass can be tested for defects without any repositioning of any of the tubes 88d. It will be understood that the tubes 88d may be more than the number illustrated so as to cover both halves of the tire, instead of merely one half of the tire in the manner illustrated in the drawings. When the tubes 88d only cover one half of the tire then it is necessary to test the tire over one half of its surface and to then turn the tire around and test the other half of the tire.

Figure 12:
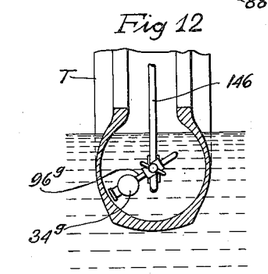

Fig. 12 illustrates still another embodiment of the construction of the support for the crystal pickup wherein the pickup 34g is mounted on a rod 96g which is in turn adjustably secured by a sleeve and thumb nut to a metal arm 146. The rod 96g may be adjustably positioned at any necessary angle or length to appropriately cooperate with any of the various oscillator tubes already described so that the defects in any given portion of the tire can be inspected.

Figure 10:
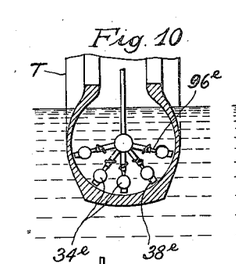
Figs. 10, 11 and 12 illustrate various forms of pickup means which may be employed with the apparatus of my invention.
Figure 11:
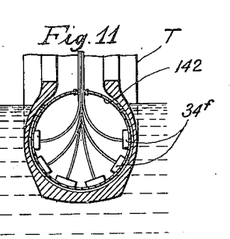

Figs. 10 and 11 illustrate other modifications of the pickup means associated with my invention. Particularly, Fig. 10 shows a plurality of crystal pickups 34e which are positioned around an arc in a single plane transversely of the tire T so that the crystal pickups will receive ultrasonic or high frequency audible vibrations from any desired portion of the tire carcass. Each pickup may be adjustable as shown in Fig. 12. Each individual pickup may be connected to its own amplifier, or the pickups may be connected to a single amplifier by means of a multiple switch which connect any selected pickup to the amplifier. Any of the various oscillator means heretofore described may be used with the pickups of Fig. 11.

Fig. 11 illustrates a plurality of pickups 34f secured to the inside of a metal or other ring 142, with the ring being closed at its ends, if desired, and received in a plane in the cross section of the tire, and with space between the ring 142 and the inside of the tire being filled with a liquid, such as water. The pickups 34f may be connected to one or more amplifiers, as suggested in conjunction with Fig. 10, and may be used with any of the oscillator means heretofore described. If the ring 142 is closed at its ends the water tight cases on the pickups can be eliminated.

Figure 13:
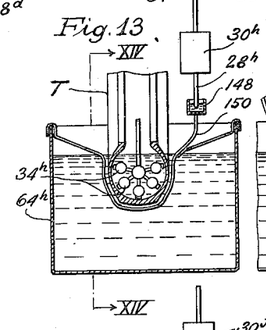
Fig. 13 is a view similar to Figs. 7, 8 and 9 and illustrating still another embodiment of my invention.
Figure 14:
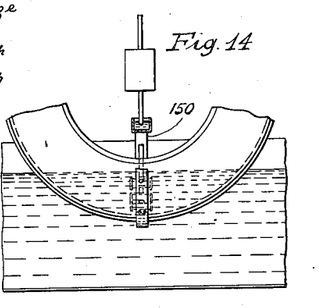
Fig. 14 is a view taken substantially on line XIV—XIV of Fig. 13.

In the embodiment of my invention shown in Figs. 13 and 14, use is made of the fact that sound vibrations are emitted equally well from the sides of a tube, or in this case a band, transversely to the direction of the tube length as well as from the end of the tube. I have observed that the sound intensity drops off very rapidly as the distance from the tube or band increases, thereby making it imperative that the source of the sound be near the tire surface. Heretofore, I have described the use of sound vibrations from the end of a tube or tubes since the tube ends are near the tire surface, and the sides of the tube, being further removed from the tire surface, were ineffective as a source of sound vibrations. Now, I propose to make use of the transverse vibrations from a metal band.

In the embodiment of my invention shown in Figs. 12 and 14 the high frequency sound waves are transmitted to a tire by metal means, and as seen in the indicated figures one embodiment of such means includes the oscillator 30h having the usual nickel tube 28h, the lower end of which extends into liquid received within a cup 148 and carried on the end of a flat bar of metal 150 bent to a U-shape and surrounding the tire T adjacent the side walls and tread portion of the tire but in closely spaced relation therefrom. The metal strap 150 is supported on the sides of the tank 64h, and may be of various sizes and interchangeable to accommodate various sizes of tires. Although any of the several forms of pickup means already described may be used with the oscillator means of Fig. 13, nevertheless I preferably employ pickup means 34h similar to the pickup means 34e of Fig. 10. Thus, apparatus is provided whereby a single revolution of the tire will give a complete inspection thereof when the individual pickups are used with individual amplifiers.

Figure 15:
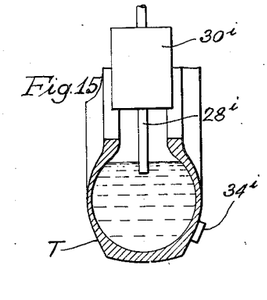
Fig. 15 is a view similar to Figs. 10, 11 and 12 but illustrating an embodiment of the invention wherein the high frequency sound producing means are positioned inside of the tire and the pickup means are positioned on the outside of the tire.

It should be particularly understood that any of the several embodiments of my invention are adapted to be so associated with the tire being inspected that the oscillator means are positioned on the inside of the tire and the sound wave pickup means are positioned on the outside of the tire. Specifically, any of the metal band or tube or other oscillators above described may be adapted to be positioned inside of the tire being tested with any suitable pickup means ouside of the tire and with the oscillators or pickups being used with or without liquid contact means. By way of further example, I have particularly illustrated in Fig. 15 an oscillator 30i positioned on the inside of the tire and so that the lower end of the nickel rod 28i engages with liquid received within the tire. Suitable pickup means, indicated generally by the numeral 34i, is adapted to be positioned on the outside of the tire, and may be employed with or without suitable liquid contacting means.

Figure 16:
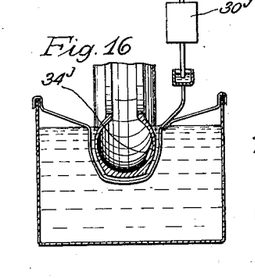
Fig. 16 is a view similar to Fig. 13 but illustrating a modification thereof.

Referring to Fig. 16 of the drawings I have illustrated a modification of my invention which is quite similar to that illustrated in Figs. 13 and 14 and above described, except that pickup means 24j are used in which the pickup means contact with the inner peripheries of the tire without any liquid being present in the tire. Suitable oscillator means other than the one shown in Fig. 16 may be likewise employed.

It will be appreciated that any one of the several mechanisms for supplying and directing high frequency waves at the tire or object being tested may be employed in conjunction with any one of the several pickup mechanisms, and any selected combination other than those above described may be built into commercial form.

From the foregoing it will be recognized that the various objects of my invention have been achieved by the provision of improved methods and apparatus for facilitating the detection of any flaws or defects in a pneumatic tire or similar object, and with the methods and apparatus being relatively simple, inexpensive, easily operated or performed and adapted to accurately locate the character and extent of any separation or break in the tire carcass. In this connection it might be noted that experience teaches that certain changes in the visual or audible indications of the apparatus mean certain types of defects while other changes in the indication mean still other types of defects in the tire.

It should be understood that my invention is primarily adapted to the inspection and testing of pneumatic tires for internal defects, however, I have found that the principles of my invention can also be adapted to the testing of non-ferrous or other metals. The only essential modification in testing metals is that a frequency of around 500 kilocycles should be employed rather than the somewhat lower frequencies best adapted for operation upon rubber or rubber and fabric materials.

While in accordance with the patent statutes, I have specifically illustrated and described my invention, it should be partcularly understood that I am not to be limited thereto or thereby, but that the scope of my invention is defined in the appended claims.

I claim:

1. That method of detecting separations or breaks in a rubber or rubber and fabric article which comprises supporting the article for movement, immersing at least a portion of the article in a liquid, creating high frequency sound waves in the liquid and directing the sound waves to strike a portion of the article immersed in the liquid, picking up the sound waves from another portion of the article immersed in the liquid and opposed to that portion of the article receiving the sound waves, amplifying the picked up sound waves, filtering out substantially all sound waves except those within the transmitted frequencies, changing the picked up sound waves to provide sensuous indication thereof, effecting relative movement between the article and sound waves so as to subject different portions of the article to the sound waves, and noting any change in the sensuous indication which would indicate a separation or break in the article.

2. That method of detecting internal flaws in an article which comprises supporting the article for movement, immersing at least a portion of the article in a liquid, creating ultra sonic sound waves in the liquid and directing the sound waves to strike a portion of the article immersed in the liquid, picking up the ultrasonic sound waves from another portion of the article immersed in the liquid and opposed to that portion of the article receiving the sound waves, amplifying the picked up sound waves, filtering out substantially all sound waves except those within the transmitted frequencies, changing the picked up sound waves to provide sensuous indication thereof, effecting relative movement between the article and the sound waves so as to subject different portions of the article to the sound waves, and noting any change in the sensuous indication which would indicate a flaw in the article.

3. That method of testing a tire or the like for internal flaws which comprises positioning the tire substantially in a vertical plane, putting some liquid in the bottom arcuate portion of the tire, subjecting the liquid to sound vibrations of frequencies of over about 10,000 cycles per second, picking up the vibrations transmitted through the wall of the tire at a plurality of points on the outer surace of the tire, changing the picked up vibrations into sensuous indications thereof, and rotating the tire to test other portions thereof.

4. Apparatus for detecting defects in a pneumatic tire carcass or the like and comprsing means for supporting the tire for rotation about a horizontal axis, means for holding liquid in engagement with at least an arcuate portion of the tire, means for creating ultrasonic sound waves of between about 10,000 cycles and about 20,000 cycles per second in the liquid, means for directing the sound waves against a portion of the tire immersed in the liquid, means for picking up the sound waves from another portion of the tire immersed in the liquid and opposed to that portion of the tire receiving the sound waves, means for amplifying the picked up sound waves, means for filtering out substantially all sound waves except those within the transmitted frequencies, and means for changing te filtered sound waves to provide sensuous indication thereof.

5. Apparatus for detecting defects in a pneumatic tire carcass or the like and comprising means for supporting the tire for rotation about a horizontal axis, means for holding liquid in engagement with at least an arcuate portion of the tire, means for creating sound waves of over 10,000 cycles per second in the liquid, means for directing the sound waves against a portion of the tire immersed in the liquid, means for picking up the sound waves from another portion of the tire immersed in the liquid and opposed to that portion of the tire receiving the sound waves, means for amplifying the picked up sound waves, and means for changing the sound waves to provide sensuous indication thereof.

6. Apparatus for detecting defects in a pneumatic tire carcass or the like and comprising means for holding liquid in engagement with at least an arcuate portion of the tire, means for creating high frequency sound waves of over 10,000 cycles per second in the liquid, means for picking up the sound waves from another portion of the tire immersed in the liquid, means for amplifying the picked up sound waves, and means for changing the sound waves to provide sensuous indication thereof.

7. Apparatus for detecting defects in a tire carcass or the like and comprising means for supporting the tire, means for holding liquid in engagement with at least an arcuate portion of the tire, means for creating high frequency sound waves in the liquid, means for directing the sound waves against a portion of the tire immersed in the liquid, means for picking up the sound waves from another portion of the tire immersed in the liquid and opposed to that portion of the tire receiving the sound waves, means for amplifying the picked up sound waves, and means for changing the sound waves to provide sensuous indication thereof.

8. Apparatus for detecting defects in a tire carcass or the like and comprising means for supporting the tire, means for holding liquid in engagement with at least an arcuate portion of the tire, means for creating sound waves in the liquid, means for directing the sound waves against a portion of the tire immersed in the liquid, means for picking up the sound waves from another portion of the tire, means for amplifying the picked up sound waves, and means for changing the sound waves to provide sensuous indication thereof.

9. Apparatus for detecting defects in a pneumatic tire carcass or the like and comprising adjustable means engaging with the bead portion of the tire and supporting the tire for rotation about a horizontal axis, means for holding water in engagement with at least an arcuate portion of the tire, a magneto-striction oscillator having a nickel rod extending into the water and creating sound waves of between about 10,000 cycles and about 20,000 cycles per second in the water, means for directing the sound waves against a portion of the tire immersed in the water, said means being adapted to be adjustably positioned at any side wall or tread portion of the tire, piezo-electric means for picking up the sound waves from another portion of the tire immersed in the water and opposed to that portion of the tire receiving the sound waves, vacuum tube means for amplifying the picked up sound waves, electric means for filtering out substantially all sound waves except those within the transmitted frequencies, and a rectifier and a direct current meter for changing the filtered sound waves to provide visible indication thereof.

10. Apparatus for testing materials for internal flaws and comprising a magneto-striction oscillator having a vibrating nickel tube, means for supporting the article to be tested, means for holding a body of liquid in contact with at least a portion of the article, with the nickel tube extending into the liquid and transmitting high frequency sound waves through the liquid into the article, piezo-electric means for picking up the sound waves after they have passed through the article, and means for giving sensuous indication of the picked up sound waves.

11. Apparatus for detecting defects in a pneumatic tire carcass or the like and comprising means for holding liquid in engagement with at least an arcuate portion of the tire, means for creating high frequency sound waves of over 10,000 cycles per second in the liquid, means for picking up the sound waves from another portion of the tire immersed in the liquid, and means for changing the sound waves to provide sensuous indication thereof.

WILFORD E. MORRIS.